United States Patent
Sharma et al.

(10) Patent No.: US 9,729,483 B2
(45) Date of Patent: Aug. 8, 2017

(54) ANONYMOUS CALLING AND/OR TEXTING VIA CONTENT PROVIDER WEB SITES AND APPLICATIONS

(71) Applicant: Verizon Patent and Licensing Inc., Basking Ridge, NJ (US)

(72) Inventors: Manish Sharma, San Jose, CA (US); Kevin Flores, San Jose, CA (US); Devin Blong, Penngrove, CA (US); Tushar Chaudhary, Mountain View, CA (US); Annu Yadav, San Francisco, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 209 days.

(21) Appl. No.: 14/132,813

(22) Filed: Dec. 18, 2013

(65) Prior Publication Data
US 2015/0172241 A1 Jun. 18, 2015

(51) Int. Cl.
*H04L 12/58* (2006.01)
*H04W 4/14* (2009.01)

(52) U.S. Cl.
CPC .............. *H04L 51/12* (2013.01); *H04L 51/32* (2013.01); *H04W 4/14* (2013.01)

(58) Field of Classification Search
CPC .... G06Q 30/00; G06Q 10/10; G06Q 30/0226; G06Q 30/0236; G06Q 30/0237; H04L 12/581; H04L 63/0407; H04L 63/0421; H04L 67/306; H04L 51/04; H04L 51/32; H04L 67/14; H04L 9/00; H04L 29/06; H04L 29/08072; H04L 51/20;
(Continued)

(56) References Cited

U.S. PATENT DOCUMENTS 8,655,722 B1 * 2/2014 Boyle ................ G06Q 30/0236
705/14.27
9,071,579 B1 * 6/2015 Bender ............... H04L 63/0428
(Continued)

OTHER PUBLICATIONS

Wikipedia, "Chat Room", http://en.wikipedia.org/wiki/Chat_room, Nov. 10, 2013, 3 pages.
(Continued)

*Primary Examiner* — Nicholas Taylor
*Assistant Examiner* — Michael Li

(57) ABSTRACT

A device provides for display, to a first user device, information associated with a potential contact, and an option to communicate with the potential contact. The device receives a selection of the option from the first user device, and obtains, based on the selection, an identifier for a second user device associated with the potential contact. The device provides a communication request and the identifier to a message server to cause the message server to selectively cause a communication session to be established between the first user device and the second user device. An indication that the communication session is denied may be provided to the first user device when the second user device does not accept the communication request. The communication session may be established, without revealing the identifier to the first user device, when the second user device accepts the communication request.

20 Claims, 12 Drawing Sheets

(58) Field of Classification Search
CPC ....... H04L 51/38; H04L 63/10; H04L 63/102;
H04L 63/104; H04L 63/0428; H04L
29/12122; H04L 51/12; H04L 51/14;
H04L 61/1547; H04M 3/42; H04M
3/42008; H04W 4/12; H04W 8/26; H04W
12/02; H04W 4/206
See application file for complete search history.

(56) References Cited

U.S. PATENT DOCUMENTS

| | | | | |
|---|---|---|---|---|
| 2008/0010344 A1* | 1/2008 | Wherry | ............. | G06F 17/30893 709/204 |
| 2008/0025488 A1* | 1/2008 | Dean | ................. | H04M 3/42008 379/201.11 |
| 2009/0124270 A1* | 5/2009 | Kelley | ................ | H04L 63/0407 455/466 |
| 2009/0209202 A1* | 8/2009 | Martini | ................. | H04W 12/02 455/41.2 |
| 2009/0227290 A1* | 9/2009 | Chien | ................. | G06F 21/6254 455/558 |
| 2010/0250592 A1* | 9/2010 | Paquet | ................... | G06Q 10/10 707/770 |
| 2011/0159861 A1* | 6/2011 | Pratt | ................... | H04L 63/0407 455/417 |
| 2013/0185368 A1* | 7/2013 | Nordstrom | .............. | H04L 51/32 709/206 |
| 2015/0017959 A1* | 1/2015 | Leboucher | ............ | H04L 67/306 455/415 |

OTHER PUBLICATIONS

Brazen Careerist, "We're all About Engagement", http://www.brazencareerist.com/index.html, May 22, 2013, 9 pages.

* cited by examiner

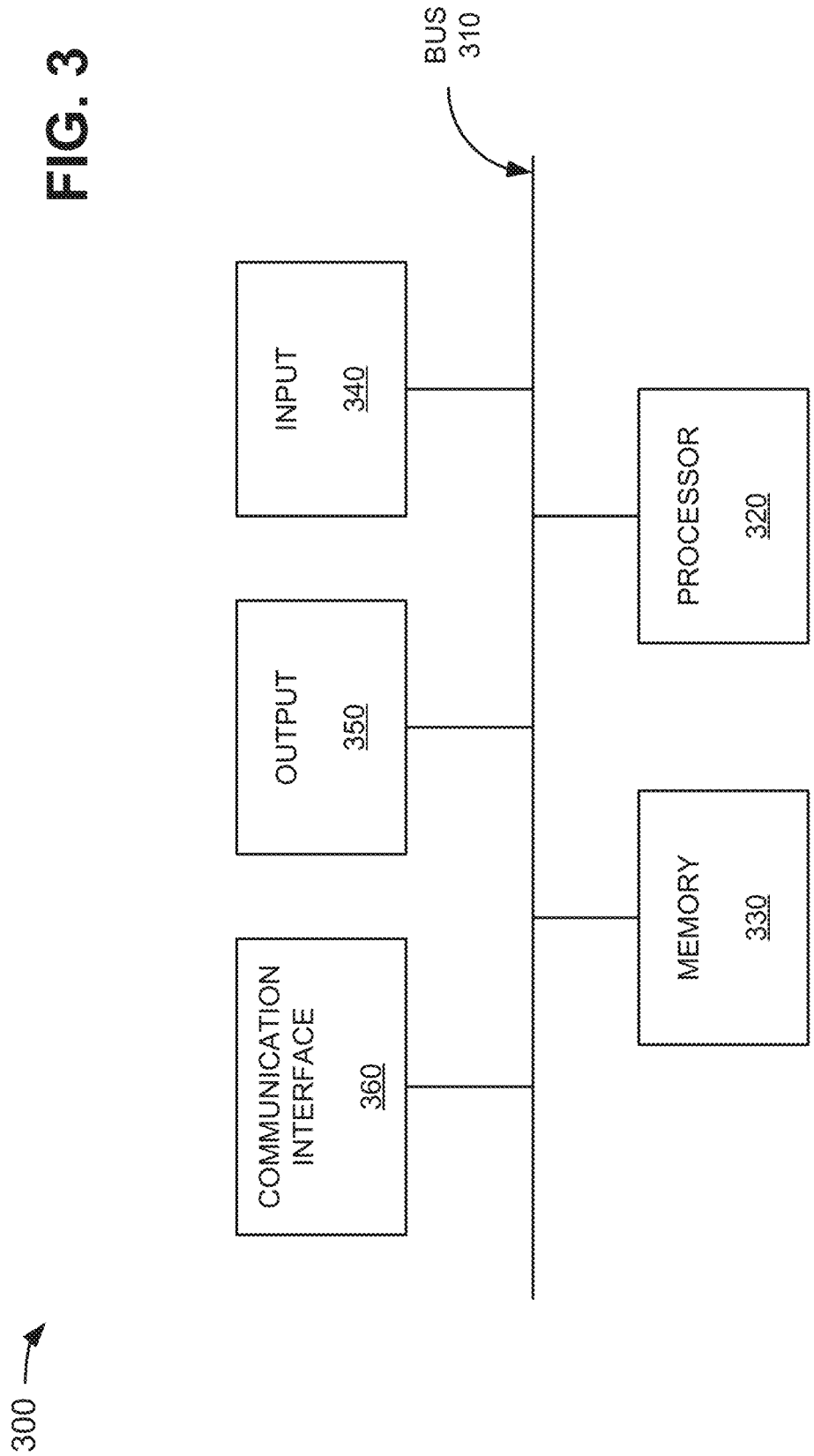

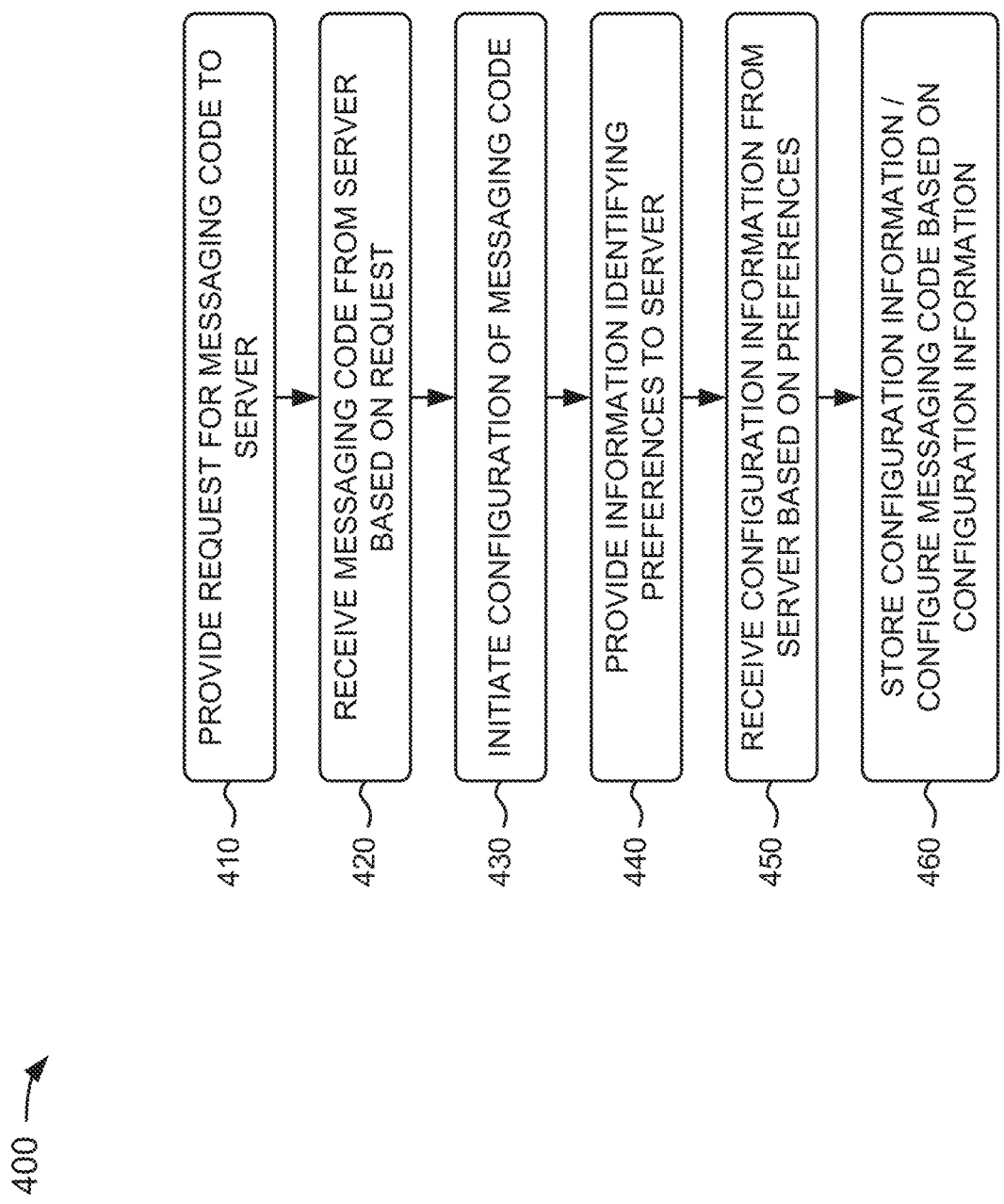

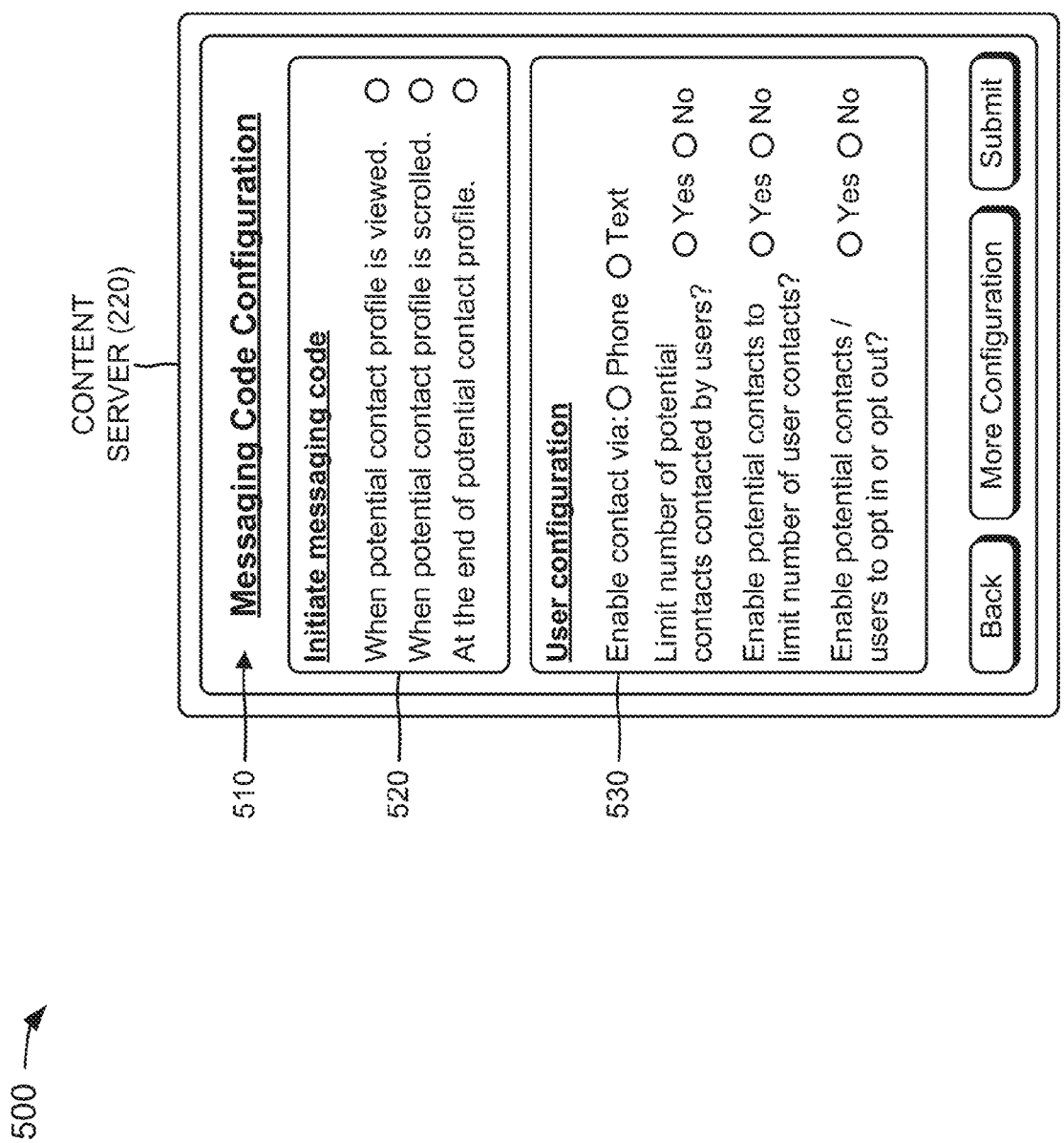

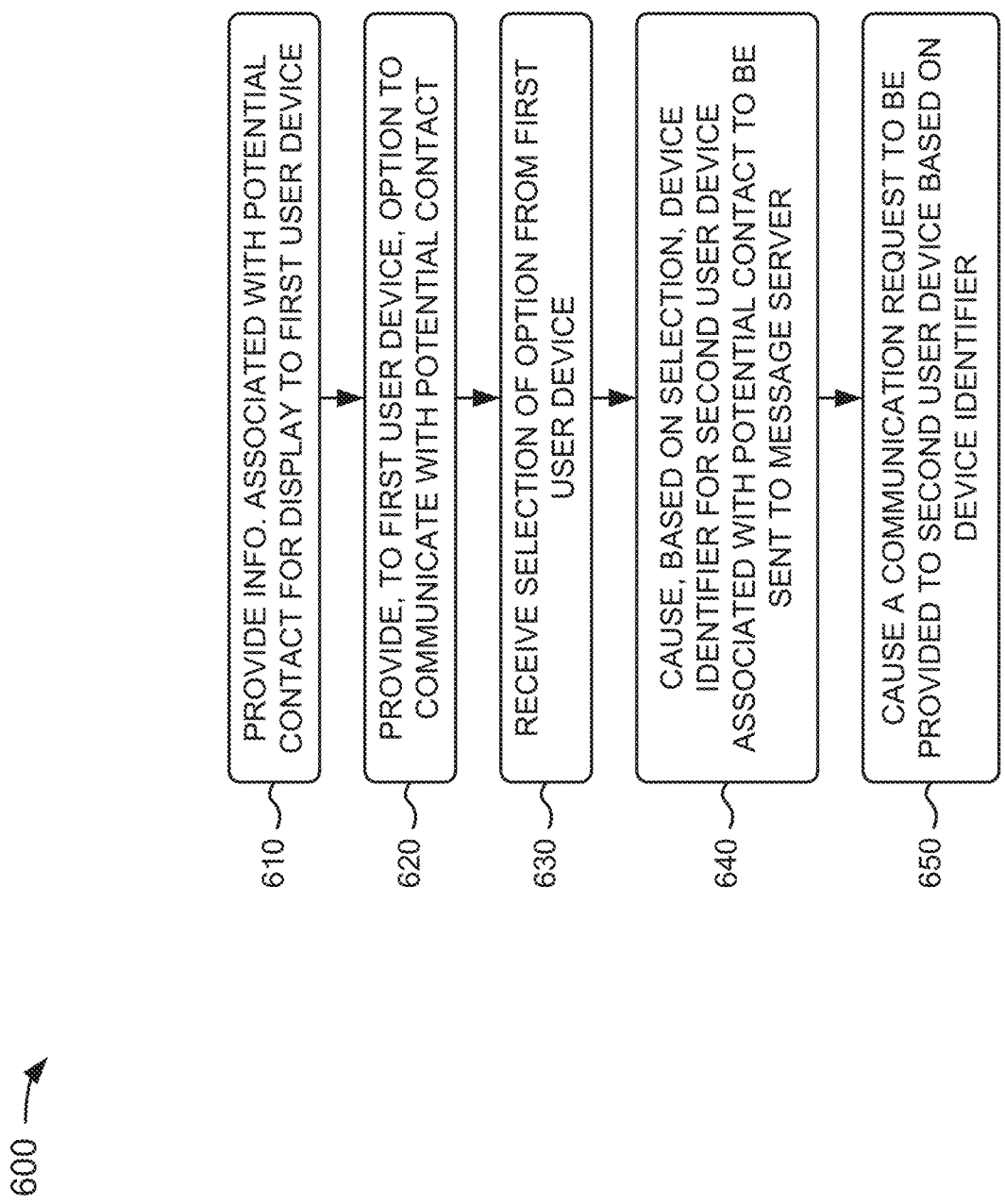

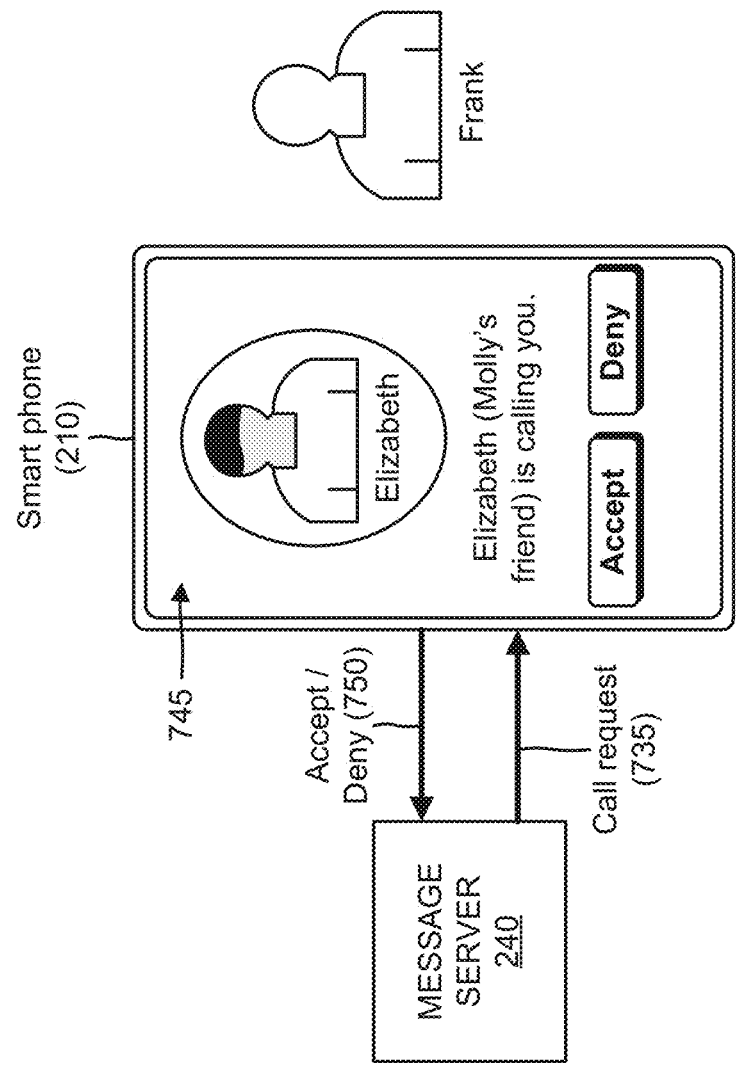

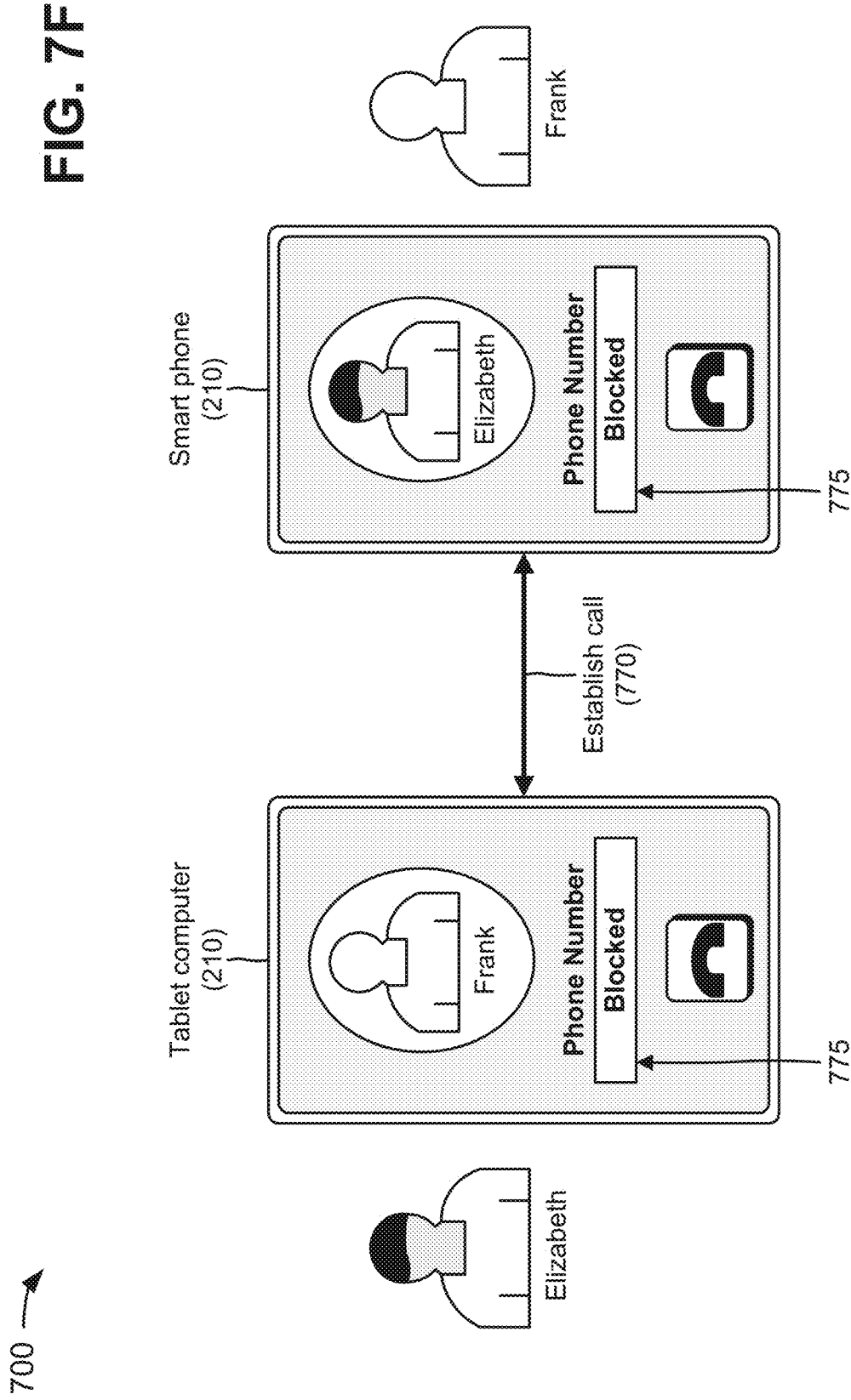

ANONYMOUS CALLING AND/OR TEXTING VIA CONTENT PROVIDER WEB SITES AND APPLICATIONS

BACKGROUND

A user may utilize a device (e.g., a smart phone, a laptop computer, etc.) to access and view content, such as, for example, a web site, a video, etc., provided by a content provider. Some of the content providers may provide social network web sites, professional network web sites, etc. that include profile information associated with members of the networks. The user may attempt to contact a member of a social network, a professional network, etc. by generating an email message via a web site associated with the network. The web site may send the email message to an email address associated with the member, and the member may view the email message. In such arrangements, the user may not know the email address of the member since the web site may not reveal the member's email address to the user.

BRIEF DESCRIPTION OF THE DRAWINGS

FIG. 3 is a diagram of example components of a device that may correspond to one or more of the devices of the environment depicted in FIG. 2;

FIG. 4 is a flow chart of an example process for receiving and configuring code that enables content provider web sites and/or applications to provide anonymous calling and/or texting;

FIG. 5 is a diagram of an example user interface that may be used in connection with the example process shown in FIG. 4;

FIG. 6 is a flow chart of an example process for providing anonymous calling and/or texting initiated via content provider web sites and/or applications; and FIGS. 7A-7F are diagrams of an example relating to the example process shown in FIG. 6.

DETAILED DESCRIPTION OF PREFERRED EMBODIMENTS

The following detailed description refers to the accompanying drawings. The same reference numbers in different drawings may identify the same or similar elements.

Figure 1:
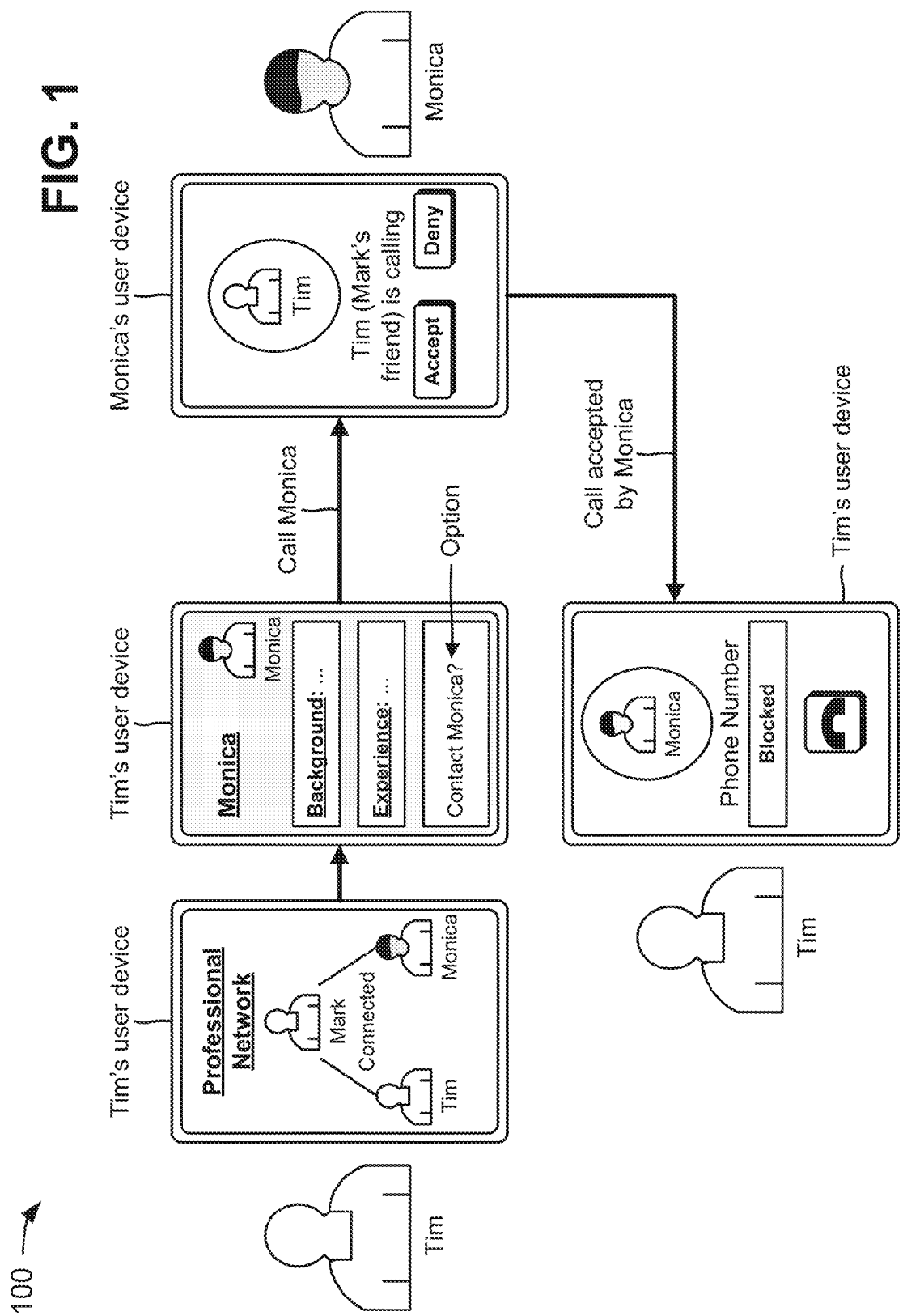
FIG. 1 is a diagram of an overview of an example implementation described herein.

FIG. 1 is a diagram of an overview of an example implementation 100 described herein. As shown in FIG. 1, assume that Tim is associated with a user device that receives content (e.g., a professional network provided by a web site) from a content provider. Further, assume that, in the professional network, Mark is connected with Tim and Monica, but Tim and Monica are not connected. Tim may consider Monica a potential contact, and may want to learn more about Monica for a potential employment opportunity at Tim's company. Thus, Tim may select information associated with Monica (e.g., an image of Monica, a link, etc.), via the web site, and the web site may present a profile associated with Monica. The profile may include information associated with Monica's work background, work experience, educational background, etc. As further shown in FIG. 1, the profile may include an option to contact Monica (e.g., via a telephone call and/or a text message), while preserving an anonymity of an identifier (e.g., a telephone number) associated with Monica's user device.

Tim may select the option, and the web site may, for example, place a call to Monica's user device, without revealing the telephone number of Monica's user device to Tim. As further shown in FIG. 1, Monica's user device may receive the call from the web site, and may display information indicating that the call is from Tim (e.g., Mark's friend) and an option to accept or deny the call requested by Tim. If Monica denies the call, the web site may provide, to Tim's user device, an indication that Monica denied Tim's call. If Monica accepts the call, the web site may cause Monica's user device and Tim's user device to establish the call so that Tim may speak with Monica. In some implementations, the web site may enable call to be established via a message server, or may cause Monica's user device to call Tim's user device. During the call, Tim's user device may not display the telephone number of Monica's user device, and Monica's user device may not display the telephone number of Tim's user device.

The systems and/or methods described herein may enable users to call or text a user device of another user (e.g., a potential contact), via a content provider's web page, web site, application, etc., without knowing an identifier (e.g., a mobile directory number (MDN), a mobile equipment identifier (MEID), a telephone number, etc.) of the user device. The content provider may facilitate the connection of the user devices, and may not be involved once the connection is made. This may enable the user to possibly establish a relationship with the potential contact without divulging the telephone number of potential contact to the user.

Content, as used herein, is to be broadly interpreted to include a web site, a web page, an application, a video, audio, an image, text, a software download, and/or a combination of a web site, a web page, an application, a video, audio, an image, text, and/or a software download.

Figure 2:
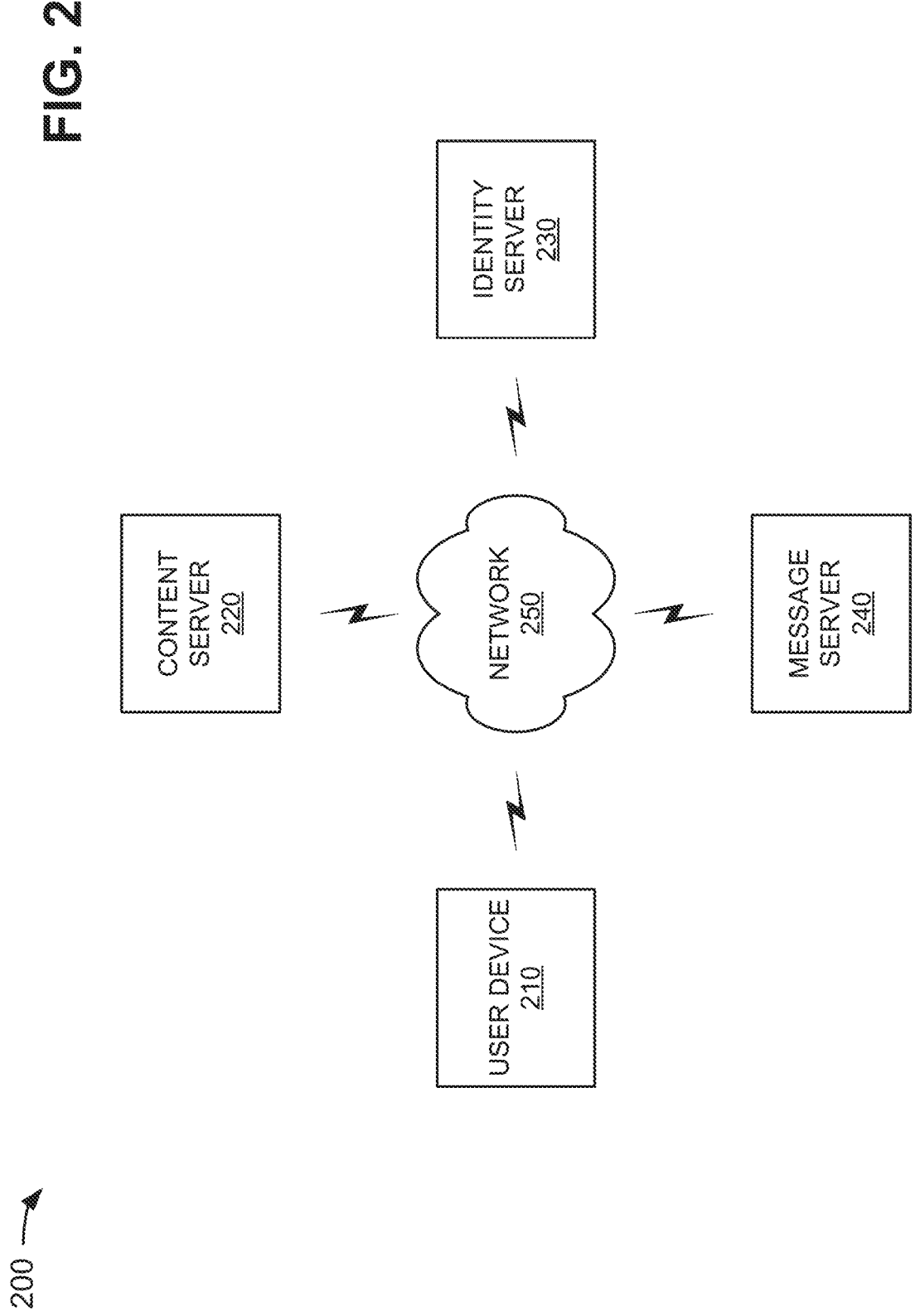
FIG. 2 is a diagram of an example environment in which systems and/or methods described herein may be implemented.

FIG. 2 is a diagram of an example environment 200 in which systems and/or methods described herein may be implemented. As illustrated, environment 200 may include a user device 210, a content server 220, an identity server 230, a message server 240, and a network 250. Devices/networks of environment 200 may interconnect via wired connections, wireless connections, or a combination of wired and wireless connections.

User device 210 may include a device that is capable of communicating over network 250 with content server 220, identity server 230, and/or message server 240. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet-intranet access, etc.; a laptop computer; a tablet computer; a desktop computer; a workstation computer; a personal computer; a landline telephone; a gaming device; or another type of computation and communication device.

Content server 220 may include one or more personal computers, workstation computers, server devices, or other types of computation and communication devices. In some implementations, content server 220 may provide content to user device 210 (e.g., via a web site and/or an application), and may enable a user of user device 210 to contact (e.g., via a telephone call and/or text message) another user via the web site and/or the application. In some implementations, content server 220 may enable the user of user device 210 to contact the other user (e.g., a potential contact) without revealing an identifier (e.g., a telephone number) of a user device 210 associated with the other user.

Identity server 230 may include one or more personal computers, workstation computers, server devices, or other types of computation and communication devices. In some implementations, identity server 230 may be associated with a communication provider (e.g., an Internet service provider, a telecommunications service provider, etc.) of the user of user device 210. In some implementations, identity server 230 may retrieve an identifier (e.g., a MDN, a MEID, an Internet protocol (IP) address, etc.) associated with a particular user device 210 of a potential contact of the user when the user of user device 210 attempts to call and/or text the potential contact via a web site and/or an application provided by content server 220. In some implementations, identity server 230 may provide software code (e.g., messaging code) to content server 220. The software code may enable the user of user device 210 to contact the particular user device 210 via the web site and/or the application provided by content server 220 and without revealing an identifier of the particular user device 210 to the user.

Message server 240 may include one or more personal computers, workstation computers, server devices, or other types of computation and communication devices. In some implementations, message server 240 may provide a messaging service for user device 210. For example, message server 240 may provide an email messaging service for user device 210, a telephone service for user device 210, a short message service (SMS) or text messaging service for user device 210, an instant messaging service for user device 210, etc.

Network 250 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for receiving and configuring code that enables content provider web sites and/or applications to provide anonymous calling and/or texting. In some implementations, one or more process blocks of FIG. 4 may be performed by content server 220. In some implementations, one or more process blocks of FIG. 4 may be performed by another device or a group of devices separate from or including content server 220.

As shown in FIG. 4, process 400 may include providing a request for messaging code to a server (block 410). For example, a content provider may cause content server 220 to provide a request for messaging code to identity server 230. In some implementations, the messaging code may include an application, a code snippet, a script, a widget, etc. that may enable a user of user device 210 to call and/or text another user device 210 of another user directly via a web site and/or an application provided by content server 220 and without knowing an identifier of the other user device 210. In some implementations, the content provider may cause content server 220 to access the messaging code via, for example, a user interface (such as a browser) or in another manner. The content provider may then select, using content server 220, information regarding the messaging code from the user interface to cause content server 220 to provide a request for the messaging code to identity server 230. In some implementations, identity server 230 may offer the messaging code to content server 220 without content server 220 providing the request for the messaging code.

As further shown in FIG. 4, process 400 may include receiving the messaging code from the server based on the request (block 420). For example, content server 220 may receive the messaging code from identity server 230, and may store the messaging code in a memory associated with content server 220 (e.g., memory 330, FIG. 3). In some implementations, the content provider, of content server 220, may establish an account associated with the messaging code prior to or after receiving the messaging code.

As further shown in FIG. 4, process 400 may include initiating a configuration of the messaging code (block 430). For example, the content provider may initiate the messaging code and identify, using content server 220, one or more preferences relating to enabling a user of user device 210 to call and/or text another user device 210 of another user via a web site and/or an application provided by content server 220 and without knowing an identifier of the other user device 210. In some implementations, the content provider may identify the one or more preferences using one or more elements of a user interface provided by content server 220. The one or more elements may include, for example, one or more text input elements, one or more drop down menu elements, one or more checkbox elements, one or more radio button elements, and/or any other types of elements that may be used to receive information from the content provider.

In some implementations, the one or more preferences may include a preference of the content provider with respect to when to initiate the messaging code for the user of user device 210, such as, for example, when a potential contact profile is viewed by a user of user device 210, when a potential contact profile is scrolled by the user via user device 210, at the end of a potential contact profile, etc.

In some implementations, the one or more preferences may include a preference of the content provider with respect to contacting potential contacts. For example, the content provider may elect to enable the user of user device 210 to contact the potential contact via a telephone call and/or a text message, without revealing a telephone number of the potential contact to the user.

In some implementations, the one or more preferences may include a preference of the content provider with respect to limits associated with contacting a potential contact by the user of user device 210. For example, the content provider may elect to limit a number of potential contacts that may be contacted by the user via the web site and/or the application provided by content server 220. In another example, the content provider may enable potential contacts to limit a number of requests for contact received from users via the web site and/or the application provided by content server 220.

In some implementations, the one or more preferences may include a preference of the content provider with respect to enabling the user of user device 210 to call and/or text another user device 210 of a potential contact via the web site and/or the application provided by content server 220. For example, the content provider may enable the potential contacts to opt in or opt out of enabling the user to call and/or text the potential contacts via the web site and/or the application provided by content server 220.

In some implementations, a type of the account, of the content provider, associated with the messaging code may determine the quantity of preferences that the content provider is able to identify. For example, the messaging code may enable the content provider to identify only a portion of the above preferences or identify additional preferences based on the type of the account with which the content provider is associated.

As further shown in FIG. 4, process 400 may include providing information identifying one or more preferences to the server (block 440). For example, the content provider may cause content server 220 to provide, to identity server 230, information identifying the one or more preferences relating to the content provider and provided during the configuration of the messaging code.

As further shown in FIG. 4, process 400 may include receiving configuration information from the server based on the preferences (block 450). For example, content server 220 may receive, from identity server 230, configuration information that may be used to configure the messaging code to enable a user of user device 210 to call and/or text another user device 210 of another user via a web site and/or an application provided by content server 220 and without knowing an identifier of the other user device 210.

In some implementations, identity server 230 may generate the configuration information, which may be used to configure the messaging code, based on the information identifying the one or more preferences of the content provider. For example, the configuration information may include information that indicates that the messaging code is to be initiated when a potential contact profile is accessed from content server 220, information that indicates that the messaging code is to be initiated when the potential contact profile is scrolled by a user of user device 210, and/or information that indicates that messaging code is to be initiated at the end of the potential contact profile.

In some implementations, the configuration information may include information that enables a user of user device 210 to call and/or text another user device 210 of another user via a web site and/or an application provided by content server 220 and without knowing an identifier of the other user device 210. In some implementations, the configuration information may include information that indicates whether the user of user device 210 can contact a potential contact via a telephone call and/or a text message. In some implementations, the configuration information may include information associated with limiting a number of potential contacts that may be contacted by the user via the web site and/or the application provided by content server 220. In some implementations, the configuration information may include information associated with limiting a number of requests for contact received by a potential contact from users via the web site and/or the application provided by content server 220. In some implementations, the configuration information may include information that enables the potential contacts to opt in or opt out of enabling the user to call and/or text the potential contacts via the web site and/or the application provided by content server 220.

In some implementations, the configuration information may be obtained from a data structure. In some implementations, identity server 230 may provide, to content server 220, the configuration information independent of receiving the information identifying the one or more preferences of the content provider.

As further shown in FIG. 4, process 400 may include storing the configuration information and configuring the messaging code based on the configuration information (block 460). For example, the content provider may cause content server 220 to store all or a portion of the configuration information received from identity server 230. The messaging code may be configured based on storing all or a portion of the configuration information.

In some implementations, identity server 230 may provide, to content server 220, updates to the configuration information based on use of the messaging code by the content provider and/or by users of user devices 210. For example, identity server 230 may provide updates to the configuration information when the content provider utilizes the messaging code to enable a user of user device 210 to call and/or text another user device 210 of another user via a web site and/or an application provided by content server 220 and without knowing an identifier of the other user device 210. In another example, identity server 230 may receive updates, to the configuration information, from one or more other content providers and may provide the received updates to content server 220. Content server 220 may store the updates to the configuration information. In some implementations, identity server 230 may provide the updates periodically based on a preference of the content provider and/or based on a time frequency determined by identity server 230. In some implementations, identity server 230 may determine whether to provide the updates based on the type of the account associated with the content provider.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a diagram of an example user interface 500 that may be used in connection with example process 400 shown in FIG. 4. In some implementations, user interface 500 may be provided by content server 220 to a content provider to enable the content provider to identify information (e.g., preferences) that may be used to configure messaging code 510 to enable a user of user device 210 to call and/or text another user device 210 of another user via a web site and/or an application provided by content server 220 and without knowing an identifier of the other user device 210.

As shown in FIG. 5, user interface 500 may allow the content provider to configure different features of messaging code 510. For example, the content provider may identify preferences for initiation of messaging code 510 in a configuration section 520. In some implementations, the content provider may indicate that the content provider wants to initiate messaging code 510 when a potential contact profile is accessed from content server 220 by user device 210. In some implementations, the content provider may indicate that the content provider wants to initiate messaging code 510 when the potential contact profile, provided by content server 220, is scrolled by the user of user device 210. In some implementations, the content provider may indicate that the content provider wants to initiate messaging code 510 at the end of the potential contact profile provided by content server 220 to user device 210. In some implementations, the content provider may indicate whether the content provider wants to initiate messaging code 510 a particular amount of time after user device 210 accesses the potential contact profile. For example, if the user does not move away from the potential contact profile within a particular amount of time (e.g., in seconds, minutes, etc.), then content server 220 may initiate messaging code 510.

As further shown in FIG. 5, the content provider may identify preferences for utilizing information associated with users of user devices 210 in another configuration section 530. In some implementations, the content provider may indicate whether the content provider wants to enable the user of user device 210 to contact a potential contact via a telephone call and/or a text message. In some implementations, the content provider may indicate whether the content provider wants to limit a number of potential contacts that may be contacted by the user via the web site and/or the application provided by content server 220. In some implementations, the content provider may indicate whether the content provider wants to limit a number of requests for contact received by a potential contact from users via the web site and/or the application provided by content server 220. In some implementations, the content provider may indicate whether the content provider wants to enable the potential contacts to opt in or opt out of enabling the user to call and/or text the potential contacts via the web site and/or the application provided by content server 220.

Once the content provider has identified the preferences, user interface 500 may allow the content provider to select a "Submit" option to store the preferences and/or submit the preferences to identity server 230. Identity server 230 may then provide, to content server 220, configuration information based on the preferences.

As further shown in FIG. 5, user interface 500 may also allow the content provider to select a "Back" option to cause content server 220 to provide information regarding messaging code 510. As also shown in FIG. 5, user interface 500 may allow the content provider to select a "More Configuration" option to enable the content provider to identify additional information that may be used to configure messaging code 510.

The number of elements of user interface 500 shown in FIG. 5 is provided for explanatory purposes. In practice, user interface 500 may include additional elements, fewer elements, different elements, or differently arranged elements than those shown in FIG. 5.

FIG. 6 is a flow chart of an example process 600 for providing anonymous calling and/or texting initiated via content provider web sites and/or applications. In some implementations, one or more process blocks of FIG. 6 may be performed by content server 220. In some implementations, one or more process blocks of FIG. 6 may be performed by another device or a group of devices separate from or including content server 220.

As shown in FIG. 6, process 600 may include providing information associated with a potential contact for display to a first user device (block 610). For example, a user may utilize a first user device 210 to access content provided by content server 220. In some implementations, the first user device 210 may access a web site, a web page, an application, etc. that includes content provided by content server 220, and may display the content to the user. For example, the user may provide, to the first user device 210, an address (e.g., a uniform resource locator (URL)) associated with a web page provided by content server 220, and the first user device 210 may access the content via the web page and based on the address. In some implementations, the content may include a social network, a professional network, an address book, etc. that includes one or more profiles of contacts and/or potential contacts of the user. For example, if the content is associated with a social network, the social network may include profiles of contacts of the user and profiles of other users (e.g., not contacts of the user) that may be potential contacts for the user (e.g., contacts who are contacts of contacts of the user, contacts who are contacts of contacts of contact of the user, etc.).

In some implementations, the user may utilize the first user device 210 to access a profile of a potential contact for the user. The profile may include information associated with the potential contact, such as, for example, a name, an image, a physical address, an educational background, an employment background, names of friends, names of connections, interests, etc. of the potential contact. In some implementations, content server 220 may provide messaging code 510, with the content, to the first user device 210. In some implementations, content server 220 may not provide messaging code 510 to the first user device 210, and may execute messaging code 510 at content server 220.

As further shown in FIG. 6, process 600 may include providing, to the first user device, an option to communicate with the potential contact (block 620). For example, messaging code 510 may cause content server 220 to provide, to the first user device 210, an option to communicate with (e.g., call and/or send a text message to) the potential contact. In some implementations, the first user device 210 may display the option as a window, a banner, a menu, an icon, a widget, a user interface, etc. with the content (e.g., the profile) displayed by the first user device 210. In some implementations, the option may include information asking whether the user wants to communicate with the potential contact. In some implementations, content server 220 may personalize the option to include information asking whether the user wants to call or send a text message to the potential contact based on the potential contact's preferred method of being contacted. For example, assume that the user accesses a profile of a potential contact named Fred. Further, assume that Fred specified to content server 220 that any unsolicited contact of Fred is to be via a telephone call, without revealing Fred's telephone number. In such an example, content server 220 may personalize the option to include information asking whether the user wants to contact Fred via only a telephone call.

In some implementations, content server 220 may enable the potential contact to opt in or opt out of enabling others to communicate with the potential contact via the content provided by content server 220. In some implementations, content server 220 may limit a number of potential contacts that may be called and/or texted by the user via the content provided by content server 220. In some implementations, content server 220 may enable the potential contact to limit a number of requests for contact that may be received from users via the content provided by content server 220. In some implementations, content server 220 may enable the potential contact to define preferences associated with users that may attempt to call and/or send a text message to the potential contact via the content. For example, the potential contact may indicate that only users that are friends and/or work colleagues with one or more of the potential contact's friends and/or work colleagues may attempt to call and/or send a text message to the potential contact via the content.

As further shown in FIG. 6, process 600 may include receiving selection of the option from the first user device (block 630). For example, the user may utilize the first user device 210 to select the option to communicate with the potential contact, and content server 220 may receive the user's selection of the option. In some implementations, when the user selects the option, the first user device 210 may provide, to content server 220, information (e.g., a message) indicating that the option is selected, and content server 220 may receive the information.

As further shown in FIG. 6, process 600 may include causing, based on the selection, a device identifier for a second user device associated with the potential contact to be sent to a message server (block 640). For example, messaging code 510 may cause content server 220 to obtain, based on the selection of the option, a device identifier (e.g., a MDN, a MEID, etc.) for a second user device 210 associated with the potential contact. In some implementations, content server 220 may provide information identifying the potential contact to identity server 230, and identity server 230 may provide, to content server 220, the device identifier of the second user device 210 based on the information identifying the potential contact. In such implementations, the information identifying the potential contact may include, for example, a name of the potential contact, a profile identifier for the potential contact, a method of contacting the potential contact (e.g., telephone call and/or text message), etc. In some implementations, content server 220 may store the information identifying the potential contact. In some implementations, content server 220 may provide the device identifier to message server 240.

In some implementations, content server 220 may provide information identifying the potential contact to identity server 230, and identity server 230 may provide the device identifier directly to message server 240 based on the information identifying the potential contact, rather than providing the device identifier to content server 220.

In some implementations, the device identifier may be encrypted so that the device identifier may not be available to content server 220. In such implementations, message server 240 may share encryption mechanisms (e.g., encryption keys) with identity server 230 so that message server 240 may decrypt the encrypted device identifier and determine the device identifier.

In some implementations, identity server 230 may include or be associated with a data structure (e.g., a database, a table, a list, etc.) that includes device identifiers (e.g., MDNs, MEIDs, telephone numbers, IP addresses, etc.); information associated with potential contacts that correspond to the device identifiers (e.g., names of the potential contacts, profiles of the potential contacts, preferred methods of contacting the potential contacts, etc.); and/or other information associated with potential contacts (e.g., information associated with user devices 210 or components of user devices 210). Identity server 230 may compare the information identifying the potential contact with the information provided in the data structure in order to identify the device identifier of the second user device 210 associated with the potential contact. In some implementations, if the information identifying the potential contact matches information associated with a particular contact, provided in the data structure, identity server 230 may determine that the particular contact is the potential contact and may provide the device identifier for the particular contact to content server 220 and/or message server 240.

As further shown in FIG. 6, process 600 may include causing a communication request to be provided to the second user device based on the device identifier (block 650). For example, messaging code 510 may cause content server 220 to create a communication request (e.g., a call request and/or a text message request) destined for the second user device 210 based on the device identifier associated with the second user device 210. In some implementations, the communication request may include information identifying the user, information identifying any potential relationship of the user with the potential contact, and/or information indicating that the user wishes to call and/or send a text message to the second user device 210. For example, if a user (e.g., Harry) is friends with George and wants to send a text message to George's friend Mary, content server 220 may generate a text request that indicates that Harry, George's friend, wants to send a text to Mary's user device 210.

In some implementations, content server 220 may forward the communication request to message server 240. In some implementations, message server 240 may forward the communication request to the second user device 210 associated with the potential contact, without revealing the device identifier of the second user device 210 to the user of the first user device 210. For example, if a call request is to be provided to Martha, content server 220 or the first user device 210 may provide the call request to message server 240, and message server 240 may provide the call request to the second user device 210 associated with Martha, without revealing the device identifier of the second user device 210 to the user of the first user device 210.

In some implementations, the second user device 210 may display the communication request to the potential contact. In some implementations, the communication request may include an option to accept or deny the communication request. For example, if Mary' user device 210 receives a text message request indicating that Harry, George's friend, wants to send a text to Mary's user device 210, the text message request may include an option to accept or deny Harry's text message request. In some implementations, if the potential contact accepts the call request and/or the text message request, the second user device 210 may provide an indication of acceptance to message server 240, and message server 240 may receive the indication of acceptance. In some implementations, if the potential contact denies the communication request, the second user device 210 may provide an indication of denial to message server 240, and message server 240 may receive the indication of denial. In some implementations, the potential contact may provide, via the second user device 210, a reason for denying the communication request (e.g., I cannot talk right now, etc.), an alternative method of contacting the potential contact (e.g., please email me instead), etc. with the indication of denial.

In some implementations, if message server 240 receives the indication of denial of the communication request from the second user device 210, message server 240 may provide, to content server 220, a message indicating that the potential contact denied the communication request. In some implementations, content server 220 may provide the message to the first user device 210, and the first user device 210 may display the message to the user. In some implementations, content server 220 may provide the reason for denying the communication request, the alternative method of contacting the potential contact, etc. (e.g., provided by the potential contact) with the message. In such implementations, the user may utilize the first user device 210 to contact the potential contact via the alternative method (e.g., via email).

In some implementations, if message server 240 receives the indication of acceptance of the communication request from the second user device 210, message server 240 may establish a communication session between the first user device 210 and the second user device 210. In some implementations, the communication session may be established, by message server 240, without revealing the device identifier of the second user device 210 to the user. In some implementations, the communication session may be established, by message server 240, without revealing a device identifier of the first user device 210 to the potential contact. In some implementations, the user and potential contact may engage in the communication session via the first user device 210 and the second user device 210, respectively and message server 240 may drop out of the communication session (e.g., rather than act as a go between). In some implementations, the potential contact may provide the device identifier of the second user device 210 to the user verbally (e.g., during the call) or textually (e.g., during the text messaging session).

In some implementations, messaging code 510 may cause content server 220 to provide the potential contact with an option to reveal the device identifier of the second user device 210 any time during the communication session with the user. If the potential contact selects the option, content server 220 and/or message server 240 may provide the device identifier of the second user device 210 to the first user device 210. The first user device 210 may display the device identifier of the second user device 210 to the user.

In some implementations, one or more of the operations described above in connection with FIG. 6 may be performed by identity server 230 and/or message server 240. In such implementations, identity server 230 may provide an address book service that enables the user to search for potential contacts and to attempt to contact user devices 210 of the potential contacts, without revealing device identifiers of user devices 210 to the user. In such implementations, the address book service may provide profiles of potential contacts that subscribe to services (e.g., a telecommunications service) provided by identity server 230. In such implementations, the user may search the profiles of the potential contacts, and may view a profile of a particular contact. The user may attempt to communicate with a particular user device 210 of the particular contact via the profile and without revealing a device identifier of the particular user device 210 to the user, thereby protecting the privacy of the particular contact.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
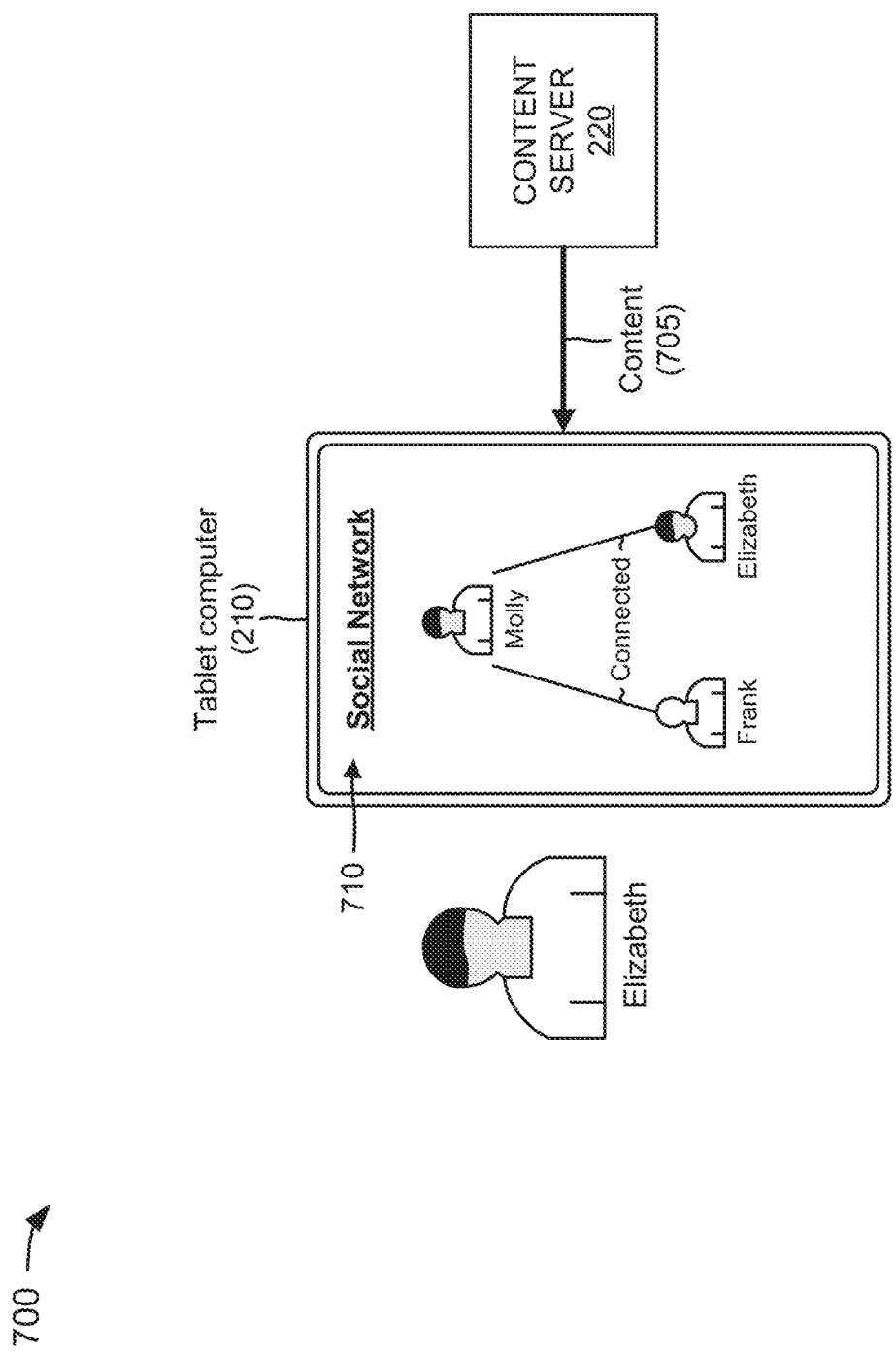

FIGS. 7A-7F are diagrams of an example 700 relating to example process 600 shown in FIG. 6. In example 700, assume that Elizabeth is associated with a first user device 210 (e.g., a tablet computer 210), as shown in FIG. 7A. Further, assume that Elizabeth utilizes tablet computer 210 to access content 705 provided by content server 220. For example, Elizabeth may access a social network 710 provided by a web site of content server 220, and tablet computer 210 may display social network 710 to Elizabeth. As further shown in FIG. 7A, assume that Molly is a contact of both Frank and Elizabeth on social network 710, but that Frank and Elizabeth are not contacts on social network 710. Further, assume that Molly, Frank, and Elizabeth were previously at an event where Elizabeth met Frank for the first time, and that Elizabeth wants to contact Frank to ask him out for coffee.

Figure 7B:
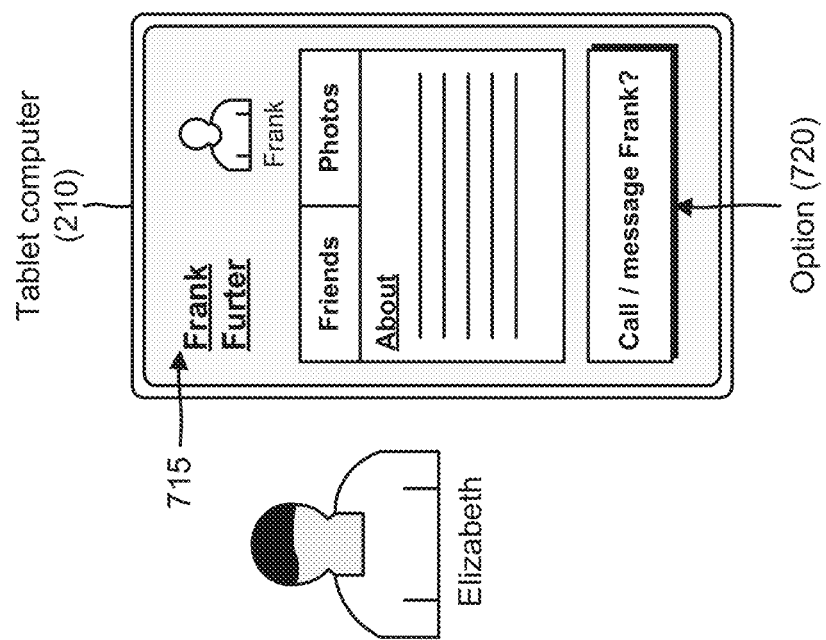

Elizabeth may select Frank's image shown in social network 710, and content server 220 may provide a profile 715 associated with Frank to tablet computer 210, as shown in FIG. 7B. Tablet computer 210 may display profile 715 to Elizabeth, as further shown in FIG. 7B. Profile 715 may include information associated with Frank, such as, for example, Frank's full name (Frank Furter), an image of Frank, names of contacts of Frank, photos of Frank, etc. As further shown in FIG. 7B, messaging code 510 may cause content server 220 to provide, to tablet computer 210, an option 720 with profile 715, and tablet computer 210 may display option 720 to Elizabeth. In example 700, option 720 may ask whether Elizabeth wants to call and/or message Frank. Assume that Elizabeth wants to call Frank, and utilizes tablet computer 210 to select option 720.

Figure 7C:
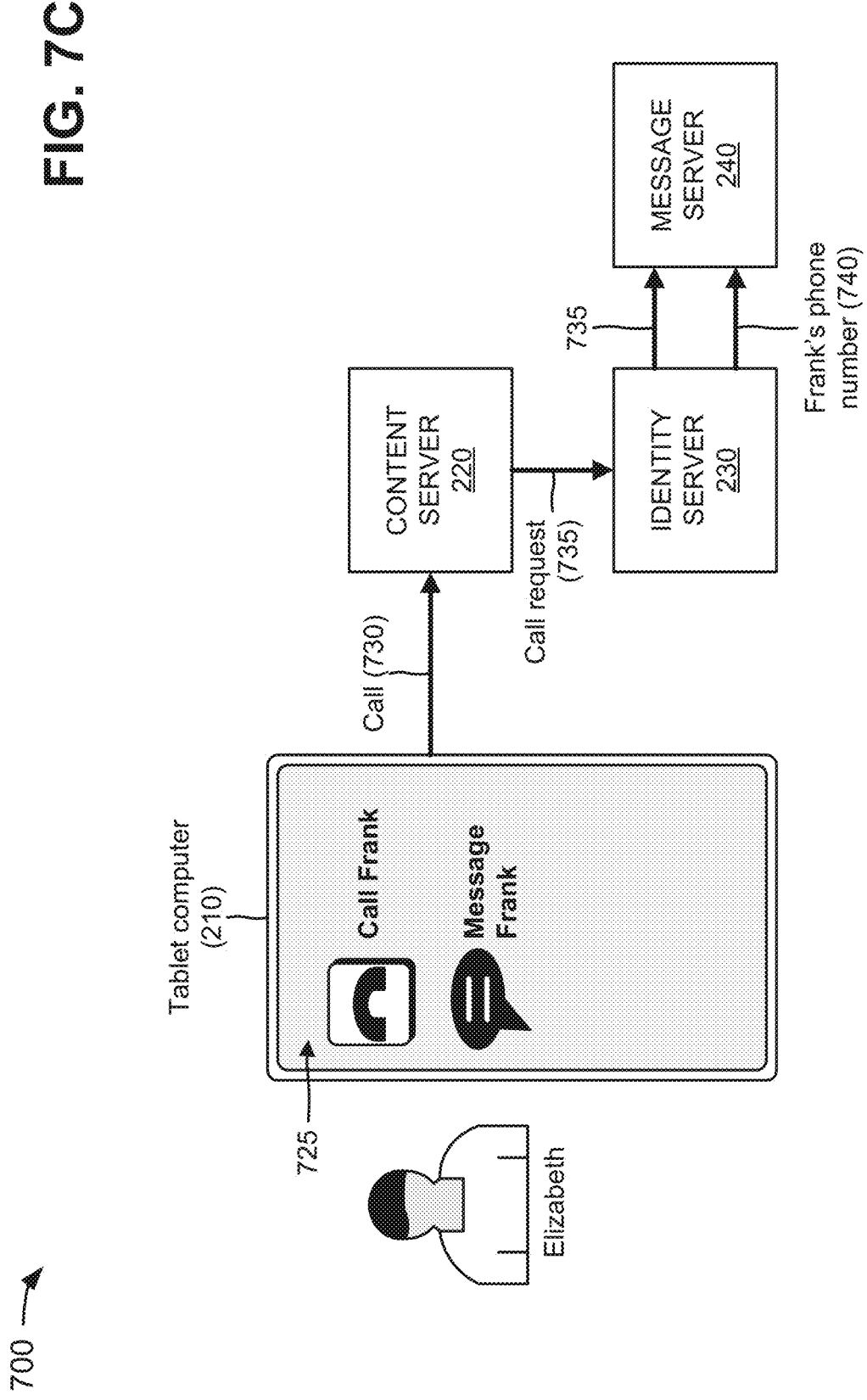

When Elizabeth selects option 720, messaging code 510 may cause content server 220 to provide, to tablet computer 210, a user interface 725, and tablet computer 210 may display user interface 725 to Elizabeth, as shown in FIG. 7C. User interface 725 may provide Elizabeth with an option to call Frank and an option to message Frank. Assume that Elizabeth utilizes tablet computer 210 to select the option to call Frank. When Elizabeth selects the option to call Frank, tablet computer 210 may provide, to content server 220, a message 730 indicating that Elizabeth wants to call Frank, as further shown in FIG. 7C. Based on message 730, messaging code 510 may cause content server 220 to generate a call request 735, and to provide call request 735 to identity server 230. Call request 735 may include information identifying Frank, and information requesting that identity server 230 retrieve Frank's phone number 740 (e.g., a device identifier associated with Frank's smart phone 210) based on call request 735. Identity server 230 may retrieve (e.g., from the data structure associated with identity server 230) Frank's phone number 740 based on call request 735, and may forward call request 735 and Frank's phone number 740 to message server 240, as further shown in FIG. 7C.

As shown in FIG. 7D, message server 240 may provide call request 735 to Frank's smart phone 210, based on Frank's phone number 740. Frank's smart phone 210 may display call request 735 to Frank via a user interface 745 that includes an image of Elizabeth, information associated with Elizabeth (e.g., "Elizabeth (Molly's friend) is calling you"), and an option to accept or deny call request 735. Frank may utilize smart phone 210 and user interface 745 to accept or deny call request 735, and smart phone 210 may provide, to message server 240, a message 750 indicating whether Frank accepts or denies call request 735, as further shown in FIG. 7D.

Figure 7E:
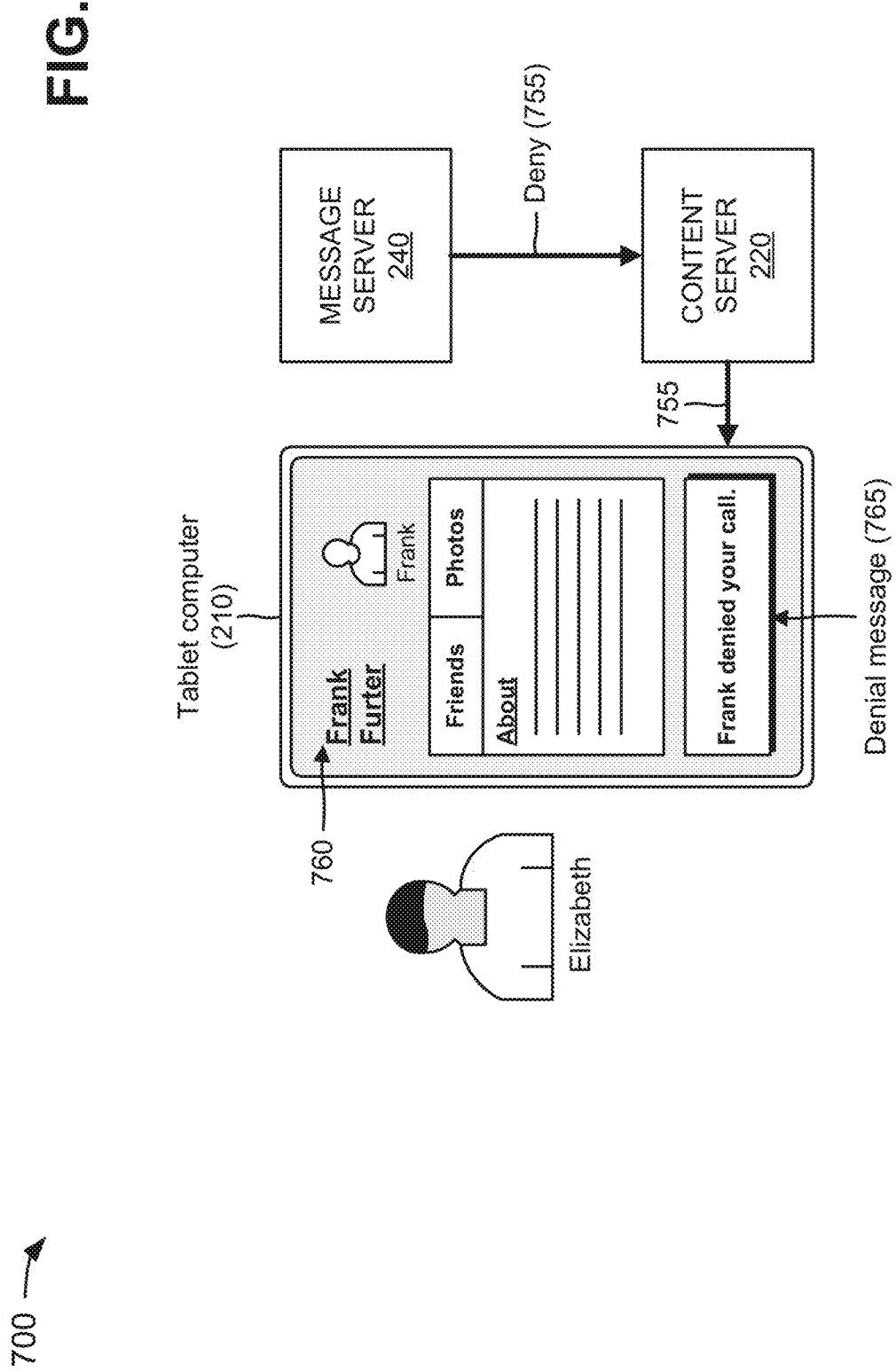

Assume that Frank denies call request 735 via user interface 745 (FIG. 7D), and that message server 240 provides, to content server 220, a message 755 indicating that Frank denies call request 735, as shown in FIG. 7E. Content server 220 may provide message 755 to tablet computer 210, and tablet computer 210 may display a user interface 760 to Elizabeth based on message 755. As further shown in FIG. 7E, user interface 760 may include Frank's profile information and a denial message 765 indicating that Frank denied Elizabeth's call.

Now assume that Frank accepts call request 735 via user interface 745 (FIG. 7D). Based on Frank's acceptance of call request 735, message server 240 may establish a call between Elizabeth's tablet computer 210 and Frank's smart phone 210, as indicated by reference number 770 in FIG. 7F. As further shown in FIG. 7F, messaging code 510 may cause message server 240 to block Frank's phone number 740 from tablet computer 210 and Elizabeth, as indicated by reference number 775. Similarly, messaging code 510 may cause message server 240 to block Elizabeth's phone number from smart phone 210 and Frank, as further indicated by reference number 775.

As indicated above, FIGS. 7A-7F are provided merely as an example. Other examples are possible and may differ from what was described with regard to FIGS. 7A-7F. In some implementations, the various operations described in connection with FIGS. 7A-7F may be performed automatically or at the request of the user.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
   providing, by a content server device, a request for a messaging code to an identity server device,
      the messaging code enabling the content server device to provide a communication request to a message server device;
   receiving, by the content server device, the messaging code from the identity server device based on the request;

providing, by the content server device and to the identity server device, information identifying preferences for the messaging code;
receiving, by the content server device and from the identity server device, configuration information for the messaging code based on the information identifying the preferences for the messaging code;
configuring, by the content server device, the messaging code based on the configuration information,
  the configuration information indicating that a first identifier, for a first user device, not be revealed;
providing for display, by the content server device and to the first user device, information associated with a potential contact;
providing for display, by the content server device and to the first user device, an option to communicate with the potential contact,
  the potential contact being associated with a second user device, and
  the option including information identifying a preferred contact method associated with the potential contact,
    the preferred contact method including a call or a text message;
receiving, by the content server device, a selection of the option from the first user device;
obtaining, by the content server device and based on the selection of the option, a second identifier for the second user device; and
providing, by the content server device, the communication request, the first identifier, and the second identifier to the message server device to cause the message server device to selectively cause a communication session to be established between the first user device and the second user device,
  the communication session including the call or a text messaging session, based on the preferred contact method associated with the potential contact,
  an indication that the communication session is denied being provided to the first user device when the second user device does not accept the communication request, or
  the communication session being established between the first user device and the second user device, without revealing the second identifier to the first user device, when the second user device accepts the communication request,
    the first identifier, for the first user device, not being revealed to the second user device when the communication session is established and based on the configuration information.

2. The method of claim 1, where the communication request includes a call request or a request to send the text message.

3. The method of claim 1, where the indication that the communication request is denied includes information indicating a reason that the communication request is denied.

4. The method of claim 1, further comprising:
providing for display, to the first user device, information associated with a professional network, a social network, or an address book service; and
providing the information associated with the potential contact to the first user device via the information associated with the professional network, the social network, or the address book service.

5. The method of claim 1, further comprising:
receiving, from the second user device, identification of the preferred contact method associated with the potential contact,
  the message server device selectively causing the communication session to be established between the first user device and the second user device via the preferred contact method.

6. The method of claim 1, where the message server device provides the call or a request to establish the text messaging session to the first user device and the second user device.

7. A device, comprising:
one or more processors to:
  provide a request for a messaging code to an identity server device,
    the messaging code enabling the device to provide a communication request to a message server device;
  receive the messaging code from the identity server device based on the request;
  provide, to the identity server device, information identifying preferences for the messaging code;
  receive, from the identity server device, configuration information for the messaging code based on the information identifying the preferences for the messaging code;
  configure the messaging code based on the configuration information,
    the configuration information indicating that a first identifier, for a first user device, not be revealed;
  provide for display, to the first user device, information associated with a potential contact,
  provide for display, to the first user device, an option to communicate with the potential contact,
    the potential contact being associated with a second user device, and
    the option including information identifying a preferred contact method associated with the potential contact,
      the preferred contact method including a call or a text message, receive a selection of the option from the first user device,
  obtain, based on the selection of the option, a second identifier for the second user device; and
  provide the communication request, the first identifier, and the second identifier to the message server device to cause the message server device to selectively cause a communication session to be established between the first user device and the second user device,
    the communication session including the call or a text messaging session, based on the preferred contact method associated with the potential contact,
    an indication that the communication session is denied being provided to the first user device when the second user device does not accept the communication request, or
    the communication session being established between the first user device and the second user device, without revealing the second identifier to the first user device, when the second user device accepts the communication request,
      the first identifier, for the first user device, not being revealed to the second user device when the communication session is established and based on the configuration information.

8. The device of claim 7, where the communication request includes a request to establish the call or a request to send the text message.

9. The device of claim 7, where the indication that the communication request is denied includes information indicating a reason that the communication request is denied.

10. The device of claim 7, where the one or more processors are further to:
provide for display, to the first user device, information associated with a professional network, a social network, or an address book service, and
provide the information associated with the potential contact to the first user device via the information associated with the professional network, the social network, or the address book service.

11. The device of claim 7, where the one or more processors are further to:
receive, from the second user device, the information identifying the preferred contact method associated with the potential contact,
the message server device selectively causing the communication session to be established between the first user device and the second user device via the preferred contact method.

12. The device of claim 7, where the message server device provides the call or a request to establish the text messaging session to the first user device and the second user device.

13. A non-transitory computer-readable medium for storing instructions, the instructions comprising:
one or more instructions that, when executed by one or more processors of a device, cause the one or more processors to:
provide a request for a messaging code to an identity server device,
the messaging code enabling the device to provide a communication request to a message server device,
receive the messaging code from the identity server device based on the request,
provide, to the identity server device, information identifying preferences for the messaging code,
receive, from the identity server device, configuration information for the messaging code based on the information identifying the preferences for the messaging code,
configure the messaging code based on the configuration information,
the configuration information indicating that a first identifier, for a first user device, not be revealed,
provide for display, to the first user device, information associated with a potential contact,
provide for display, to the first user device, an option to communicate with the potential contact,
the potential contact being associated with a second user device, and
the option including information identifying a preferred contact method associated with the potential contact,
the preferred contact method including a call or a text message, receive a selection of the option from the first user device,
obtain, based on the selection of the option, a second identifier for the second user device, and
provide the communication request, the first identifier, and the second identifier to the message server device to cause the message server device to selectively cause the call or a text messaging session to be established between the first user device and the second user device,
an indication that the call or the text messaging session is denied being provided to the first user device when the second user device does not accept the communication request, or
the call or the text messaging session being established between the first user device and the second user device, without revealing the second identifier to the first user device, when the second user device accepts the communication request,
the first identifier, for the first user device, not being revealed to the second user device when the call or the text messaging session is established and based on the configuration information.

14. The non-transitory computer-readable medium of claim 13, where the communication request includes a request to establish the call or a request to send the text message.

15. The non-transitory computer-readable medium of claim 13, where the indication that the communication request is denied includes:
information indicating a method for contacting the potential contact, or
information indicating a reason that the communication request is denied.

16. The non-transitory computer-readable medium of claim 13, where the instructions further comprise:
one or more instructions that, when executed by the one or more processors, cause the one or more processors to:
provide for display, to the first user device, information associated with a professional network, a social network, or an address book service, and
provide the information associated with the potential contact to the first user device via the information associated with the professional network, the social network, or the address book service.

17. The non-transitory computer-readable medium of claim 13, where the instructions further comprise:
one or more instructions that, when executed by the one or more processors, cause the one or more processors to:
receive, from the second user device, the information identifying the preferred contact method associated with the potential contact,
the message server device selectively causing the call or the text messaging session to be established between the first user device and the second user device via the preferred contact method.

18. The non-transitory computer-readable medium of claim 13, where the message server device provides the call or a request to establish the text messaging session to the first user device and the second user device.

19. The method of claim 1, where the configuration information comprises:
information indicating a selection that the messaging code is to be initiated when a profile of the potential contact is accessed, or
information indicating a selection that the messaging code is to be initiated at an end of the profile of the potential contact.

20. The device of claim 7, where the configuration information comprises:

information indicating a selection that the messaging code is to be initiated when a profile of the potential contact is accessed, or information indicating a selection that the messaging code is to be initiated at an end of the profile of the potential contact.

\* \* \* \* \*